United States Patent [19]

Babington, Jr. et al.

[11] 4,212,705
[45] Jul. 15, 1980

[54] APPARATUS FOR RECOVERING HIGH PRESSURE STEAM FROM A BLOW TANK

[76] Inventors: William M. Babington, Jr., 1884 Buena Vista Dr., Coshocton, Ohio 43812; Adam P. Bridge, 223 E. Second St., Franklin, Ohio 45005

[21] Appl. No.: 908,124

[22] Filed: May 22, 1978

[51] Int. Cl.² .......... D21C 7/08; D21C 7/12; D21C 11/06
[52] U.S. Cl. .......... 162/238; 162/239; 162/246; 162/253; 422/109; 422/110
[58] Field of Search .......... 23/253 A; 162/52, 246, 162/242, 238, DIG. 10, 17, 19, 49, 61, 252, 253, 41, 47, 239; 422/109, 110

[56] References Cited

U.S. PATENT DOCUMENTS

| | | | |
|---|---|---|---|
| 1,469,958 | 10/1923 | Richter | 162/52 |
| 1,947,707 | 2/1934 | French | 162/52 |
| 2,592,983 | 4/1952 | Hildebrandt | 162/246 |
| 3,007,839 | 11/1961 | Richter | 162/17 |
| 3,035,963 | 5/1962 | Schnyder | 162/19 |
| 3,064,726 | 11/1962 | Rosenblad | 162/246 |
| 3,081,820 | 3/1963 | Schnyder | 162/246 |
| 3,172,802 | 3/1965 | Rosenblad | 162/246 |
| 3,298,899 | 1/1967 | Laakso | 162/19 |
| 3,362,868 | 1/1968 | Backlund | 162/242 |
| 4,010,666 | 3/1977 | Olson et al. | 162/49 |

OTHER PUBLICATIONS

Gavelin "DTF—A New Chip Refiner Process Pioneered in Sweden;" Pulp and Paper Intl.; Jan. 1977.

Primary Examiner—S. Leon Bashore
Assistant Examiner—Steve Alvo
Attorney, Agent, or Firm—Biebel, French & Nauman

[57] ABSTRACT

A processing system including a pressurized blow tank for receiving the high pressure discharge from a wood pulp digester and utilizing the digester steam in evaporators or other heat recovery units. The blow tank which receives the treated cellulose, cooking liquor and high pressure steam from the digester also provides some additional fiber conditioning since the cellulose remains under significant pressure and temperature during the interval before it is discharged from the blow tank. A valve is provided in the blow tank for withdrawing high pressure steam separately from the cooking liquid and treated cellulose, and the valve is operated by a controller responding to pressure sensed in the blow tank. Cold cooking liquor is pumped into the blow tank in response to temperatures measured in the blow tank and the temperature of the cold liquor itself. Alternately the flow of additional cooking liquor can be controlled in response to levels sensed in the blow tank. To prevent bridging of cellulose in the tank multiple sprays are provided about the circumference of the tank for spraying cooking liquor onto the cellulose as required. Discharge from the blow tank of a slurry of cellulose and cooking liquor is through a perforated plate mounted in the bottom of the blow tank and having a rotor rotating above its inlet side.

1 Claim, 5 Drawing Figures

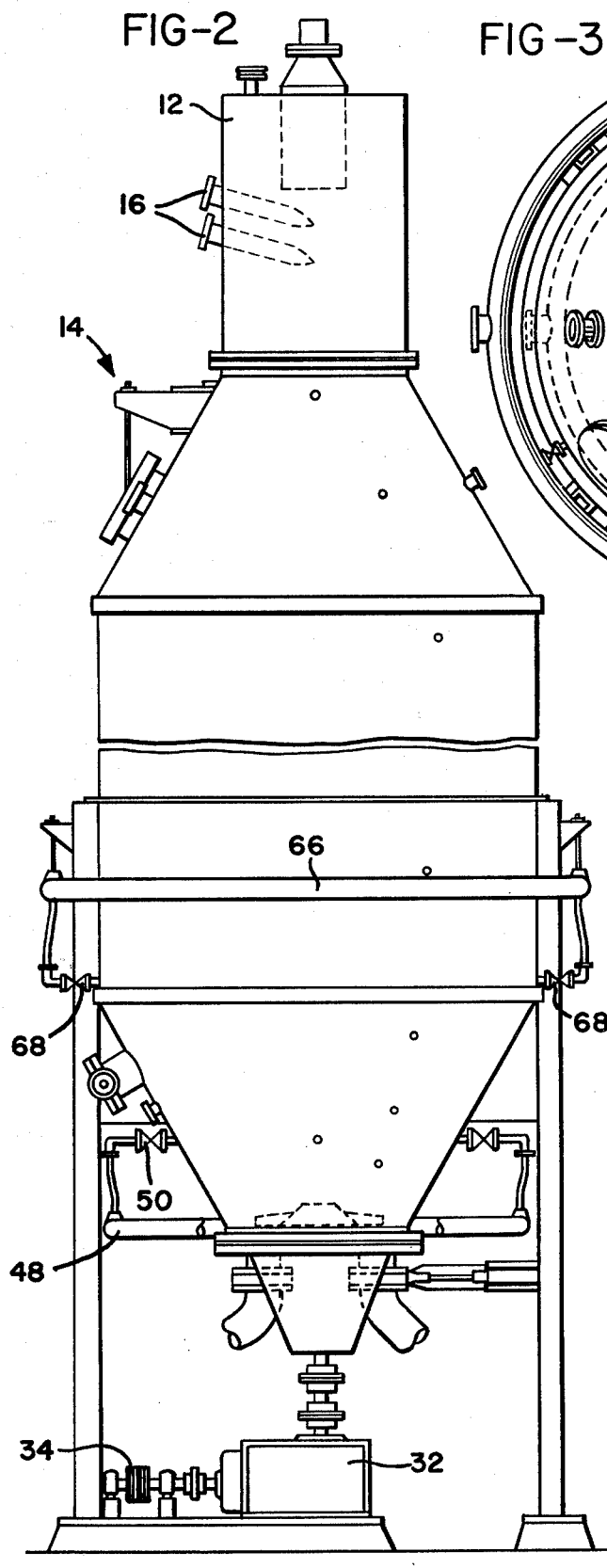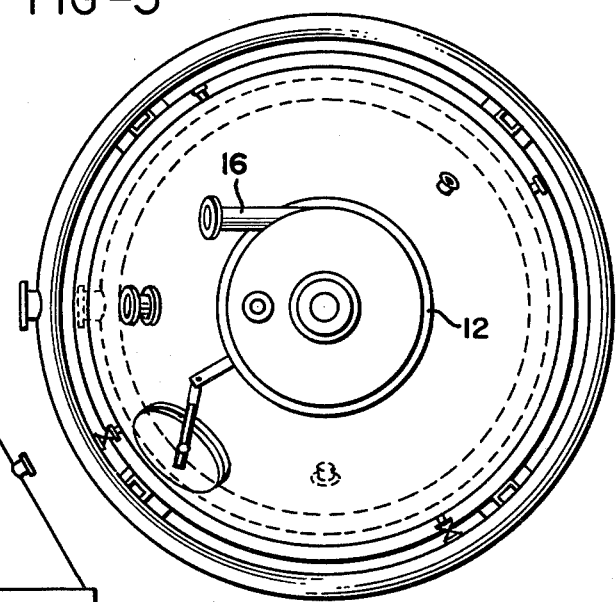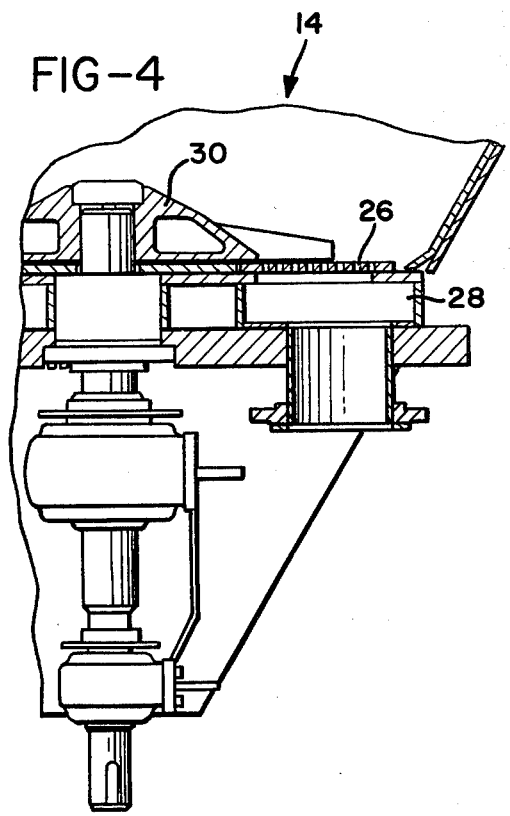

APPARATUS FOR RECOVERING HIGH PRESSURE STEAM FROM A BLOW TANK

BACKGROUND OF THE INVENTION

In the treatment of cellulose, such as in the digestion of wood chips in paper manufacture, the wood chips are treated under high pressure with steam and a chemical solution known as cooking liquor in a unit called a digester. Conventionally, after treatment in the digester the cellulose, cooking liquor and steam are discharged, usually on a continuous basis, into a unit generally referred to as a blow tank.

U.S. Pat. No. 2,870,009 discloses apparatus for recycling steam from a low pressure blow tank back to a steaming vessel for pretreatment of the wood chips being fed to a digester. It is stated in the patent that the pressure in the blow tank "is preferably not very high and may be of the order of 1 atmosphere guage". A special, two valve discharge device is utilized to prevent the tank from being exposed to high pressures from the digester, and as a result of the pressure drop of the pulp coming from the digester, gases, mostly steam, are given off from the pulp as it enters the blow tank.

While the apparatus disclosed in the above noted U.S. patent does utilize to some degree the low pressure steam from the blow tank, it will be apparent that no attempt is made to control and maintain high steam pressures in the blow tank, and in fact the opposite approach is taken, that is, steps are taken to prevent high steam pressure in the blow tank. As a result valuable high pressure steam which might be used in various heat recovery units is lost as well as an opportunity to provide significant additional fiber treatment in the blow tank.

SUMMARY OF THE INVENTION

The present invention provides a system for processing cellulosic material in a manner which produces significant quantities of high pressure steam as a by-product for use in evaporators and other heat recovery devices as well as providing additional fiber treatment in a blow tank.

Specifically, in accordance with the present invention the discharge of treated cellulose, cooking liquor and high pressure steam from a digester is received in a pressurized blow tank which is provided with controls for maintaining steam pressures in the blow tank substantially in excess of atmospheric so that high pressure steam from the digester is conserved for use in evaporators or similar apparatus.

Because the system of the present invention utilizes a high pressure blow tank and maintains the interior of the blow tank at pressures substantially above atmospheric, not only is valuable high pressure steam reclaimed from the process, but the cellulosic material receives further treatment during the time interval between its discharge into the blow tank and its withdrawal therefrom.

Pressure in the blow tank is maintained through the use of a pressure sensor, a steam discharge valve and a controller which operates the steam discharge valve in response to pressures sensed in the blow tank.

Additional cooking liquor is also pumped into the blow tank adjacent to its lower end to facilitate withdrawal of the treated cellulose from the blow tank, and the rate at which the additional liquor is pumped into the tank can be controlled either in response to temperature, levels sensed within the blow tank, or other suitable signals.

Discharge from the blow tank is effected through a perforated plate which has a rotor mounted for rotation above its inlet side. Further controls can be provided for the rate of discharge in response to pulp levels sensed in the blow tank.

A plurality of circumferentially arranged sprays are positioned to spray additional cooking liquor onto the pulp should bridging occur in the blow tank, with the sprays fed from a common circular manifold.

These and other advantages of the system of the present invention will become apparent from the following detailed description.

BRIEF DESCRIPTION OF THE DRAWINGS

FIG. 2 is an elevational view of the blow tank shown in FIG. 1;

FIG. 3 is a top view of the blow tank; and

FIG. 4 is a view, with parts in section, of a portion of the lower part of the blow tank adjacent its discharge.

DESCRIPTION OF THE PREFERRED EMBODIMENTS

Figure 1:
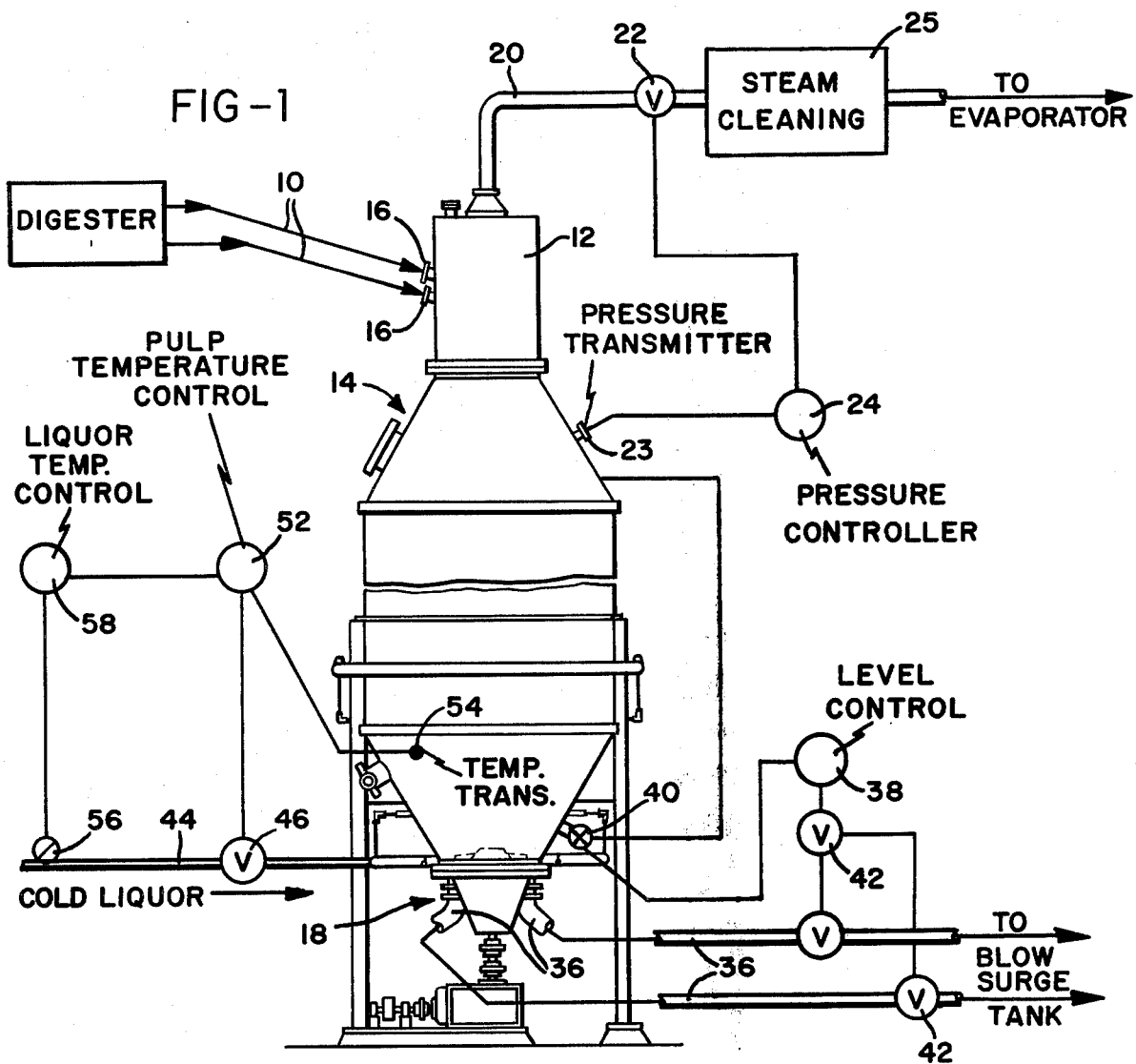
FIG. 1 is a somewhat diagrammatic representation of the system of the present invention.

In the system shown in FIG. 1 of the drawings, pulp is discharged from a digester, which may be of conventional design and for purposes of illustration discharging on a continuous basis through a pair of discharge lines 10, at pressures and temperatures substantially in excess of ambient.

For example, the pulp, which will comprise treated cellulose, cooking liquor and steam, may have a temperature close to 350° F. and a pressure of approximately 170 psi.

The high pressure, high temperature pulp passing through the discharge lines 10 from the digester enters an upper, cyclone section 12 of the blow tank 14 through a pair of vertically aligned, tangentially arranged inlet fittings 16. Cellulose and cooking liquor blown into the blow tank 14 gradually move to the bottom thereof and are withdrawn form a discharge outlet 18 while high pressure steam is withdrawn through a line 20 controlled by a valve 22.

A pressure transmitter 23 senses pressures within the blow tank and transmits the pressure sensed to a controller 24, which is connected to and controls the opening and closing of the valve 22. Through operation of the valve 22 in this manner the pressure within the blow tank 14 can be maintained at a desired level allowing high pressure steam to be withdrawn through the line 20.

In an actual installation where digester pressure is approximately 170 psig, the pressure in the blow tank is maintained at about 50 psig, allowing steam to be withdrawn at pressures in excess of 100 psig. Of course by varying the blow tank pressure through appropriate setting of the controller 24, blow tank pressure and the pressure of steam removed through line 20 can be controlled as desired. In any case, the pressure in the blow tank will be maintained in excess of atmospheric, e.g. from 20-120 psig. through the use of valve 22, pressure transmitter 23 and controller 24.

Before high pressure steam withdrawn from the blow tank is fed to evaporators or other units, the steam may be passed through any suitable steam cleaning apparatus 25 which may be of conventional design for removing impurities therefrom.

Discharge from the blow tank may be through a perforated plate 26 (see FIG. 4) which separates the interior of the blow tank 14 from a collection chamber 28. A rotor 30 is mounted above the perforated plate 26 and is driven through a speed reducer 32 (see FIG. 2) which receives a power input from a belt driven sheave 34. A suitable motor and drive belts, now shown, are provided for power input to the sheave 34.

Discharge lines as required are connected to the discharge chamber 28 with two such lines 36 being shown for purposes of illustration and communicating with a blow surge tank for collection of the pump and cooking liquor from the blow tank. A level control 38 receives signals from a level sensor 40 and controls discharge valves 42 in the lines 36. Relatively cold liquor may be fed into the blow tank through line 44 having a control valve 46 for admitting the additional liquor into a manifold 48 connected to a series of discharge valves 50 arranged circumferentially about the blow tank 14.

In one embodiment flow through the valve 46 is controlled by a pulp temperature control unit 52 which operates in response to temperatures transmitted to it by the temperature transmitters 54 which sense the temperature inside the blow tank 14 and transmitter 56, which senses the temperature of the cold liquor and transmits a signal to the liquor temperature control 58. The addition of relatively cold cooking liquor in the lower part of the blow tank in the zone of agitation created by the rotor 30 results in a homogeneous mass of pulp adjacent the discharge from the blow tank and a more uniform consistency and discharge.

Figure 1A:
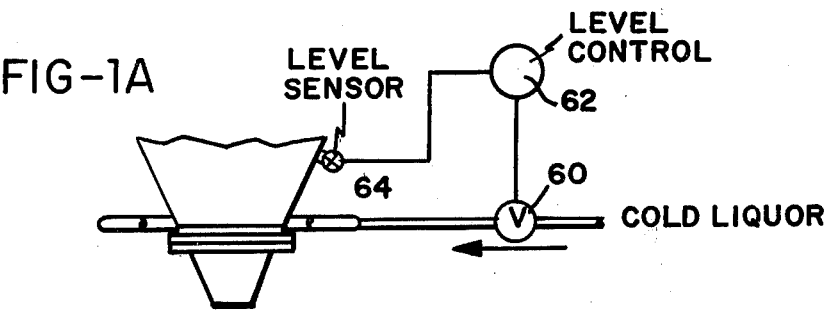
FIG. 1A depicts an alternate control circuit.

Alternatively, as seen in FIG. 1A, a cold liquor valve 60 may be controlled through a level control unit 62 operating in response to levels sensed in the blow tank by a level sensor 64, with additional cooking liquor being pumped into the tank as the level falls below a certain predetermined level and the flow of additional cooking liquor terminated as levels rise above a predetermined level in the tank. Other signals for cooking liquor addition control may be the consistency in lines 36 or a measure for production rate.

It will be noted that a second circular manifold 66 is mounted above the manifold 48 and feeds cooking liquor from any convenient source, not shown, through valves 68 communicating with the interior of the blow tank. In this way, if the pulp exhibits a tendency to bridge in the blow tank cooking liquor can be pumped through the valves 68 to spray the interior of the tank.

From the above it will be seen that the present invention provides a system for reclaiming high pressure steam from a cellulose processing system.

While the forms of apparatus herein described constitute preferred embodiments of the invention, it is to be understood that the invention is not limited to these precise forms of apparatus, and that changes may be made therein without departing from the scope of the invention

What is claimed is:

1. In a cellulose processing system including a digester for treating cellulose with liquor and steam at pressures substantially in excess of 120 PSIG, the improvement comprising:

a high pressure, discharge outlet from said digester, a high pressure blow tank for receiving treated cellulose, liquor and high pressure steam from said digester, means for placing the interior of said blow tank in communication with said high pressure, discharge outlet of said digester, means for withdrawing cellulose and liquor from said blow tank, steam discharge valve means for withdrawing steam from said blow tank separately from said cellulose and liquor, means for measuring pressure in said blow tank, control means responsive to measured pressure in said blow tank to control said steam discharge valve means and said pressure in said blow tank at a preselected value in a range of 50 to 120 PSIG, means for cleaning impurities from steam withdrawn from said blow tank through said steam discharge valve means, means for pumping additional liquor into said blow tank separately from said cellulose, liquor and high pressure steam received from said digester, first temperature sensing means associated with said blow tank for sensing temperatures therein, second temperature sensing means for sensing the temperature of said additional liquor, control means responsive to said first and second temperature sensing means for controlling the flow of said additional liquor into said blow tank, said means for withdrawing cellulose and liquor from said blow tank including a perforated plate, a rotor mounted above said plate, a discharge line communicating with said perforated plate, and valve means associated with said discharge line, means for sensing the level of cellulose and liquor in said blow tank, control means for controlling said blow tank discharge line valve means in response to levels sensed in said blow tank, and means for spraying liquor into said blow tank to prevent bridging of cellulose therein.

* * * * *